UNITED STATES PATENT OFFICE.

HAMPTON CHARLES KISHPAUGH, OF ANNANDALE, MINNESOTA.

COMPOSITION FOR PAINT.

1,417,842.  Specification of Letters Patent.  Patented May 30, 1922.

No Drawing.  Application filed February 27, 1922.  Serial No. 539,713.

*To all whom it may concern:*

Be it known that I, HAMPTON CHARLES KISHPAUGH, a citizen of the United States of America and of the State of Minnesota, residing at Annandale, in the county of Wright, State of Minnesota, have discovered a new and useful Composition for Paint, of which the following is a specification.

The nature of my discovery is the composition in the proper proportions and manner of calcium carbonate, calcium oxide and pigment for a dry paint for plastered walls, cement block, concrete, brick, stone and stucco.

My composition produces an attractive and valuable paint that is fire, water and weather proof, and adheres without checking, cracking or blistering.

I prefer to use the materials in the following proportions: To any given amount of calcium carbonate I add from five (5) to twenty five (25) per cent calcium oxide. Pigment to suit the taste is added. I use water as a vehicle for this paint.

I prefer the following method of mixing the ingredients: I grind the calcium carbonate and calcium oxide separately, each into a very finely divided state. These are thoroughly mixed and ground. Then the pigment is added and thoroughly mixed and ground with the calcium carbonate and calcium oxide mixture. When ready to use a gallon of water is added to about four (4) or five (5) pounds of the composition. It is then well stirred and applied with a brush or by spraying.

I claim—

A paint composition of calcium carbonate one hundred (100) parts, calcium oxide five (5) to twenty five (25) parts, pigment enough to produce the desired color, compounded by thoroughly mixing and grinding these ingredients in the stated proportions.

Dated at Annandale, Minnesota, this 23rd day of February, A. D. 1922.

HAMPTON CHARLES KISHPAUGH.